United States Patent
Moons et al.

(10) Patent No.: US 9,124,429 B2
(45) Date of Patent: Sep. 1, 2015

(54) COMBINATION DEVICE FOR DSL PHANTOM MODE SIGNALS IN A TELECOMMUNICATION SYSTEM

(75) Inventors: Elve Moons, Lummen (BE); Gilbert Van Campenhout, Hoboken (BE)

(73) Assignee: Alcatel Lucent, Boulogne-Billancourt (FR)

( * ) Notice: Subject to any disclaimer, the term of this patent is extended or adjusted under 35 U.S.C. 154(b) by 69 days.

(21) Appl. No.: 14/005,087

(22) PCT Filed: Apr. 3, 2012

(86) PCT No.: PCT/EP2012/056057
§ 371 (c)(1),
(2), (4) Date: Oct. 23, 2013

(87) PCT Pub. No.: WO2012/136648
PCT Pub. Date: Oct. 11, 2012

(65) Prior Publication Data
US 2014/0036653 A1 Feb. 6, 2014

(30) Foreign Application Priority Data
Apr. 8, 2011 (EP) .................................... 11305409

(51) Int. Cl.
*H04L 5/20* (2006.01)
*H04M 11/06* (2006.01)
(52) U.S. Cl.
CPC ............. *H04L 5/20* (2013.01); *H04M 11/062* (2013.01)
(58) Field of Classification Search
None
See application file for complete search history.

(56) References Cited

U.S. PATENT DOCUMENTS

| 1,762,754 | A | 6/1930 | Black |
| 5,901,151 | A | 5/1999 | Bleiweiss et al. |
| 6,507,608 | B1 | 1/2003 | Norrell |
| 8,761,348 | B2 * | 6/2014 | Cioffi et al. ................... 379/1.04 |
| 2004/0071101 | A1 * | 4/2004 | Lu et al. ......................... 370/282 |
| 2005/0152385 | A1 * | 7/2005 | Cioffi ............................ 370/420 |
| 2006/0104436 | A1 * | 5/2006 | Tesler et al. .............. 379/399.01 |

(Continued)

FOREIGN PATENT DOCUMENTS

| CN | 1574800 A | 2/2005 |
| CN | 101917492 A | 12/2010 |

(Continued)

OTHER PUBLICATIONS

PCT search report, May 4 2012.*
International Search Report PCT/ISA/210 for PCT/EP2012/056057 dated May 21, 2012.

*Primary Examiner* — Kerri Rose
(74) *Attorney, Agent, or Firm* — Harness, Dickey & Pierce, P.L.C.

(57) ABSTRACT

The combination device includes a first pair of series coupled first and second magnetically coupled coils, to which a first DSL line and a first DSL transmission line are electrically coupled, and a second pair of series coupled first and second magnetically coupled coils, to which a second DSL line and a second DSL transmission line are electrically coupled. A third DSL line is coupled to a first coupling element between the first and the second coils of the first pair, and to a second coupling element between the first and the second coils of the second pair. The combination device is located in a phantom injection module provided with at least five terminals respectively associated to the first DSL line, the second DSL line, the third DSL line, the first DSL transmission line and the second DSL transmission line.

15 Claims, 5 Drawing Sheets

(56) References Cited

U.S. PATENT DOCUMENTS

| | | | |
|---|---|---|---|
| 2006/0268966 A1* | 11/2006 | Cioffi et al. | 375/222 |
| 2009/0207985 A1* | 8/2009 | Cioffi et al. | 379/93.01 |
| 2011/0122767 A1* | 5/2011 | Dent | 370/228 |
| 2011/0299522 A1* | 12/2011 | Awatere et al. | 370/352 |
| 2012/0219085 A1* | 8/2012 | Long et al. | 375/295 |
| 2013/0154664 A1* | 6/2013 | Drooghaag | 324/539 |

FOREIGN PATENT DOCUMENTS

| | | | |
|---|---|---|---|
| EP | 2091196 A1 * | 8/2009 | H04L 25/02 |
| GB | 301317 A | 2/1930 | |
| WO | WO 2006120510 A1 * | 11/2006 | |

* cited by examiner

COMBINATION DEVICE FOR DSL PHANTOM MODE SIGNALS IN A TELECOMMUNICATION SYSTEM

This application is the national phase under 35 U.S.C. §371 of PCT International Application No. PCT/EP2012/056057 which has an International filing date of Apr. 3, 2012, which claims priority to European patent application number EP 11305409.2 filed Aug. 8, 2011; the entire contents of each of which are hereby incorporated by reference.

The present invention relates to a DSL phantom mode signal combination device adapted to convert first DSL telecommunication signals on a first DSL line, a second DSL line and a third DSL line to second DSL telecommunication signals on a first DSL transmission line and a second DSL transmission line.

The purpose of such a combination device is to add/inject DSL phantom mode signals into DSL lines of an existing telecommunication system.

The most suitable place to inject the phantom mode coupling is at the Central Office CO and more particularly at the level of the Line Terminating LT board. However this implies the design of a new Line Termination LT board which must be inserted into the system. Known drawbacks of such a solution are the board replacement itself, the required interruption of the system, the use of additional board area on the Line Termination LT board, etc. . . . . . Furthermore the existing cabling, patch panels, etc . . . between the Line Termination LT board and the MDF is not optimal for the phantom signals. This will result in either non compliance with ITU standards, e.g. Longitudinal Conversion Loss, Impedance match with Splitters, EMC-regulations, and/or result in DSL loss of performance. In some cases the 'cripple' Phantom mode will even results in equal rate-reach as what would be available with conventional bonding.

An object of the present invention is to provide a DSL phantom mode signal combination device of the above known type with good DSL performance and without major changes to the equipment and cabling, while reusing a maximum of already installed hardware.

According to a characterizing embodiment of the invention, this object is achieved due to the fact that said DSL phantom mode signal combination device comprises a first pair of series coupled first and second passive components to which said first DSL line and said first DSL transmission line are electrically coupled, and a second pair of series coupled first and second passive components to which said second DSL line and said second DSL transmission line are electrically coupled, that said third DSL line is coupled to a first coupling means between the first and the second passive component of said first pair, and to a second coupling means between the first and the second passive component of said second pair, and that said DSL phantom mode signal combination device is located in a phantom injection module provided with at least five terminals respectively associated to said first DSL line, said second DSL line, said third DSL line, said first DSL transmission line and said second DSL transmission line.

In this way, a simple circuit is provided for performing remote phantom injection. As the DSL phantom mode signal combination device is locate in a distinct phantom injection module, the DSL phantom mode signals can be added/injected almost anywhere into DSL lines without changes to the existing telecommunication equipment.

When properly designed, this DSL phantom mode signal combination device with its passive components and coupling means is fully compliant with the required standards and has only minor impact on rate-reach performance of the equipment.

Another characterizing embodiment of the present invention is that said phantom injection module is remotely located from a Line Termination LT board of a telecommunication exchange, and that said first DSL line, said second DSL line and said third DSL line are connected to distinct ports of said Line Termination LT board.

In this way, the DSL phantom mode signal combination device makes the implementation of phantom mode on existing equipment possible, e.g. without design new Line Termination LT boards.

Also another characterizing embodiment of the present invention is that said phantom injection module is associated to a Main Distribution Frame MDF of a telecommunication exchange, and that said first DSL line, said second DSL line, said third DSL line, said first DSL transmission line and said second DSL transmission line are connected to terminals of said Main Distribution Frame MDF.

This allows implementing the phantom injection module remotely but close to or even in the Main Distribution Frame MDF and performing couplings therein in a flexible way. As a result, the features of the Main Distribution Frame MDF are expanded, EMC and DSL performance issues are avoided, while the current MDF cabling and equipment can be reused.

In more detail, an embodiment of the present invention is characterized in that the first and second series coupled passive components of said first pair are coils which are magnetically coupled, a first terminal of the first coil of said first pair being connected to a first wire of said first DSL transmission line, a first terminal of the second coil of said first pair being connected to a second wire of said first DSL transmission line, and said first coupling means being connected to a first wire of said third DSL line, to the second terminal of the first coil of said first pair, and to the second terminal of the second coil of said first pair, and in that the first and second series coupled passive components of said second pair are coils which are magnetically coupled, a first terminal of the first coil of said second pair being connected to a first wire of said second DSL transmission line, a first terminal of the second coil of said second pair being connected to a second wire of said second DSL transmission line, and said second coupling means being connected to a second wire of said third DSL line, to the second terminal of the first coil of said second pair, and to the second terminal of the second coil of said second pair.

In one particular embodiment, the present DSL phantom mode signal combination device further comprises a third pair of series coupled third and fourth coils which are magnetically coupled, a first terminal of the third coil of said third pair being connected to a first wire of said first DSL line, and the first terminal of the fourth coil of said third pair being connected to a second wire of said first DSL line, a second terminal of the third coil of said third pair being electrically coupled to a second terminal of the fourth coil of said third pair via a third coupling means, and a fourth pair of series coupled third and fourth coils which are magnetically coupled, a first terminal of the third coil of said fourth pair being connected to a first wire of said second DSL line, and the first terminal of the fourth coil of said fourth pair being connected to a second wire of said second DSL line, a second terminal of the third coil of said fourth pair being electrically coupled to a second terminal of the fourth coil of said fourth pair via a fourth coupling means, the third and fourth coils of said third pair being magnetically coupled to the first and second coils of said first pair, and the third and fourth coils of said fourth pair being magnetically coupled to the first and second coils of said second pair.

By this design, the existing telecommunication system, or installed base, is reused and the present DSL phantom mode signal combination device allows very flexible and easy expansion thereof.

This embodiment is hereafter called "serial phantom injection device".

The serial phantom injection device realizes the above mentioned objectives (equipment reuse, ITU and EMC compliancy, good DSL performance, . . . ). The coupling between the first DSL line and the first DSL transmission line is done by a magnetic coupled device, and also the coupling between the second DSL line and the second DSL transmission line is done with a magnetic coupled device.

This embodiment has however one drawback. Since coupling between the DSL signals and the transmission line is done with magnetic devices the injection of narrow band POTS signals, if available, must be done at the transmission line side. This can lead to extra cabling between the DSL phantom mode signal combination device and the POTS exchange.

In another particular embodiment, the present DSL phantom mode signal combination device is characterized in that the first terminal of the first coil of said first pair is electrically coupled to a first wire of said first DSL line, and the first terminal of the second coil of said first pair is electrically coupled to a second wire of said first DSL line, and in that the first terminal of the first coil of said second pair is electrically coupled to a first wire of said second DSL line, and the first terminal of the second coil of said second pair is electrically coupled to a second wire of said second DSL line.

This other embodiment is hereafter called "parallel phantom injection device".

The first DSL line is electrical coupled to the first DSL transmission line and the second DSL line is electrical coupled with the second DSL transmission line. In this case, injection of the narrow band POTS signals can be done anywhere in the transmission line or DSL line. So this allows to inject the POTS signals near the Line Termination LT board, for instance when the existing POTS splitters are already located close to it.

This parallel phantom injection has however one drawback when the DSL phantom mode signal combination device is situated at a substantially long distance from the Line Termination LT board. The cabling between the DSL phantom mode signal combination device and the Line Termination LT board will create a STUB or Bridged Tab influencing the phantom signal since, in general, there is no common mode termination at the Line Termination LT board present at the first and the second DSL line. This drawback can however be solved by adding a common mode low pass filter into as described further.

In a preferred characterizing embodiment of the present parallel phantom injection device, the first terminal of the first coil of said first pair is electrically coupled to the first wire of said first DSL line via a first filter coil, and the first terminal of the second coil of said first pair is electrically coupled to the second wire of said first DSL line via a second filter coil, said first filter coil and said second filter coil being magnetically coupled, whilst the first terminal of the first coil of said second pair is electrically coupled to the first wire of said second DSL line via a third filter coil, and the first terminal of the second coil of said second pair is electrically coupled to the second wire of said second DSL line via a fourth filter coil, said third filter coil and said fourth filter coil being magnetically coupled.

By adding this common mode low pass filter, no STUB or Bridged Tap is created.

Moreover, the filter coils, when properly designed, create a high common mode impedance path for the differential pairs towards POTS board, for all the above implementations.

In another characterizing embodiment, the present serial phantom injection device further comprises a fifth pair of magnetically coupled fifth and sixth coils, said fifth coil of said fifth pair having a first terminal connected to a first wire of a first POTS line and a second terminal connected to said first terminal of the first coil of said first pair, and said sixth coil of said fifth pair having a first terminal connected to a second wire of said first POTS line and a second terminal connected to said first terminal of the second coil of said first pair, and a sixth pair of magnetically coupled fifth and sixth coils, said fifth coil of said sixth pair having a first terminal connected to a first wire of a second POTS line and a second terminal connected to said first terminal of the first coil of said second pair, and said sixth coil of said sixth pair having a first terminal connected to a second wire of said second POTS line and a second terminal connected to said first terminal of the second coil of said second pair.

Owing to these fifth and sixth pairs of coils, also for the serial injection module a high common mode impedance path for the differential pairs towards the POTS board is achieved, in a similar way as for the parallel injection module.

In another characterizing embodiment of the present parallel phantom injection device, a first wire of said third DSL line is coupled to a second wire of said third DSL line via a fifth coil, said first coupling means is coupled to said second coupling means via a sixth coil, and said fifth coil and said sixth coil are magnetically coupled.

In order to have the best transmission performance, the analogue front end of the DSL signals must have an impedance close to the characteristic impedance of the connected transmission line. Since the present invention make use of the existing transmission equipment, this is only accomplished for the first DSL line and the second DSL line, connected to the first and second transmission lines respectively. Signals of the third DSL line are transferred to the phantom pair, formed by the first and second transmission lines together and will in this case see a different characteristic impedance related to the used cable.

To improve the performance of the phantom pair an impedance transformation is necessary. An extra transformer will convert the existing analogue front end impedance into the correct phantom mode impedance. The coupling to this transformer can either be in a DC or AC manner, so including a high pass filter or not.

Although described here for the parallel injection module, this impedance transformation can be done in a similar way for the serial injection module.

It is to be noted that, the above description is valid for DownStream DS signals, flowing from the Central Office CO towards the Customer Premise Equipment CPE, as for UpStream US signals flowing in the other direction. The DSL phantom mode signal combination device operates in both signal directions.

Again another characterizing embodiment of the present invention is that said phantom injection module is located close to a Customer Premise Equipment CPE, and that said first DSL line, said second DSL line and said third DSL line are connected to said Customer Premise Equipment CPE.

The DSL phantom mode signal combination device and the phantom injection module housing it is not only designed to operate in the array of the Central Office CO, to which it is coupled via the first DSL line, the second DSL line and the third DSL line, but can also be designed for operating at the other end of a telecommunication line, i.e. in the array of the Customer Premise Equipment CPE.

Also another characterizing embodiment of the present invention is that said device is located in a phantom injection module adapted to house a plurality of DSL phantom mode signal combination devices.

Owing to this expansion, the injection of DSL phantom mode signals into DSL lines can be done one by one or for a group of phantom subscribers.

Further characterizing embodiments of the present DSL phantom mode signal combination device are mentioned in the appended claims.

It is to be noticed that the terms "comprising" or "including", used in the claims, should not be interpreted as being restricted to the means listed thereafter. Thus, the scope of an expression such as "a device comprising means A and B" should not be limited to an embodiment of a device consisting only of the means A and B. It means that, with respect to embodiments of the present invention, A and B are essential means of the device.

Similarly, it is to be noticed that the term "coupled", also used in the claims, should not be interpreted as being restricted to direct connections only. Thus, the scope of the expression such as "a device A coupled to a device B" should not be limited to embodiments of a device wherein an output of device A is directly connected to an input of device B. It means that there may exist a path between an output of A and an input of B, which path may include other devices or means.

The above and other objects and features of the invention will become more apparent and the invention itself will be best understood by referring to the following description of an embodiment taken in conjunction with the accompanying drawings wherein.

In a Digital Subscriber Line DSL telecommunication system, DSL Phantom mode consists of adding/injecting/coupling a common mode signal between two (or more) subscriber line pairs. The present DSL phantom mode signal combination device is designed to achieve this function.

Furthermore, the DSL phantom mode signal combination device is located in a phantom injection module PBox which allows performing the coupling remotely, for instance at a further distance from a line termination LT board. The coupling can thus be performed on a daughterboard, on another board, e.g. next to the line termination LT board or further away, located in a nearby shelf, rack or system, but the DSL phantom mode signal combination device can also be remotely located anywhere, for instance close to or even in a Main Distribution Frame MDF. The phantom injection module PBox can house one or more of such DSL phantom mode signal combination devices and may for instance be located in a box.

The implementation of the DSL phantom mode signal combination device may be done in the Central Office, but also in the Customer Premise Equipment CPE.

In any condition, the implementation of the DSL phantom mode signal combination device is performed with a maximum reuse of already installed hardware, e.g. existing line termination LT boards, POTS/splitter boards and cabling.

In more detail, the DSL phantom mode signal combination device is located in a phantom injection module PBox provided with at least five terminals of which three are associated to a first DSL line DM1, a second DSL line DM2 and a third DSL line DM3. The two other terminals are associated to a first DSL transmission line P1 and a second DSL transmission line P2. It is to be noted that in the Figs. the terminals are named as the lines associated thereto.

Figure 1:
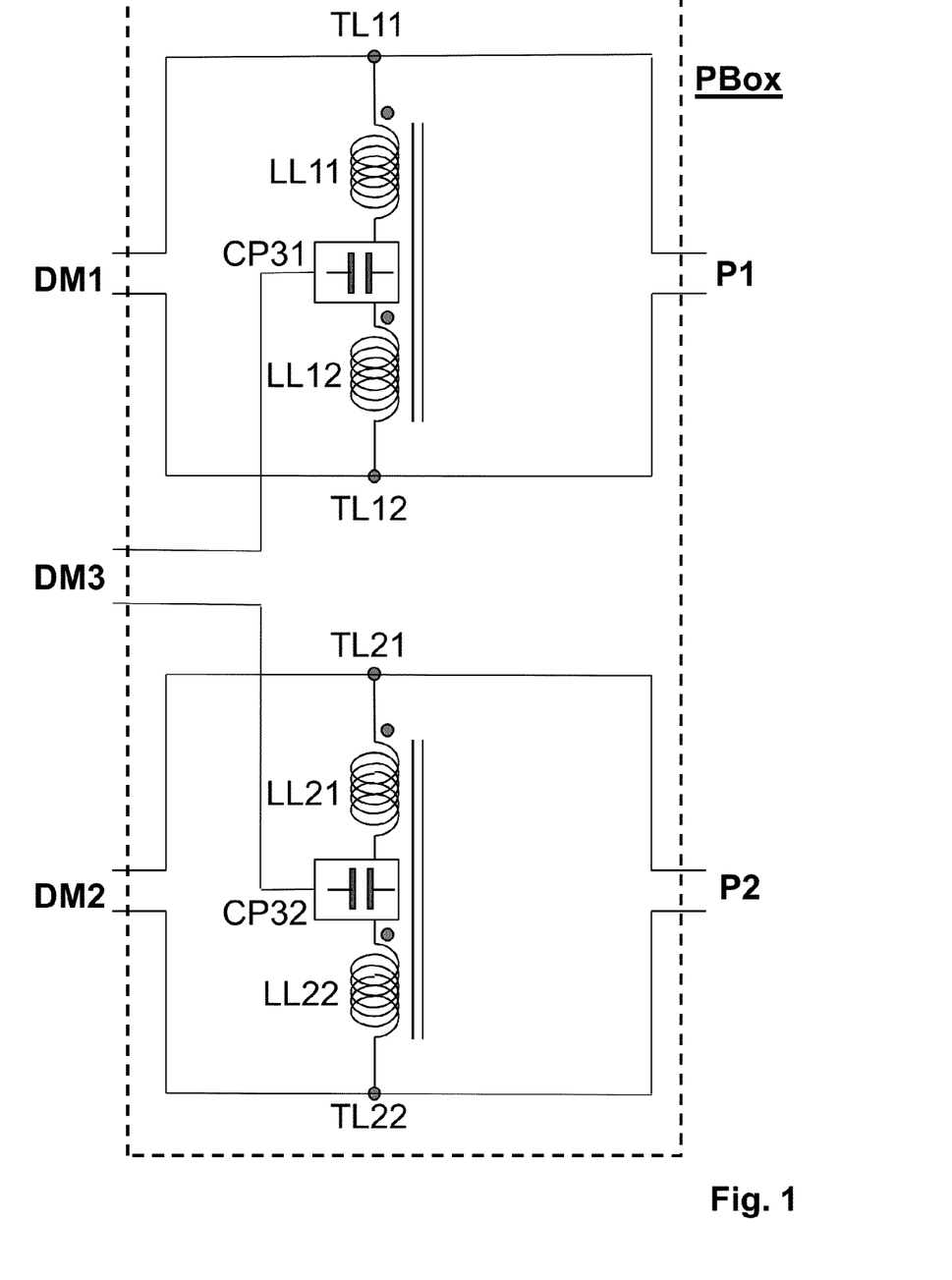
FIG. 1 represents a parallel embodiment of the DSL phantom mode signal combination device according to the invention.

A first implementation of the DSL phantom mode signal combination device, called "parallel phantom injection", is shown at FIG. 1. Therein, the DSL phantom circuitry is put in parallel between the wires in the subscriber pair, i.e. the first DSL transmission lines P1 and P2.

In case of the parallel injection module, the terminals associated to the DSL lines DM1 and DM2 are adapted to receive telecommunication signals comprising Digital Subscriber Line DSL information and Plain Old Telephone System POTS information, while for the serial injection module the POTS information must be injected at the DSL transmission lines P1 and P2.

It is to be noted that, in the latter case, when a POTS low pass common mode filter is required, a sixth and seventh terminal needs to be added, as will be explained later by making reference to FIG. 5.

The terminal associated to the third DSL line DM3 is adapted to receive telecommunication signals comprising only Digital Subscriber Line DSL information. These three DSL telecommunication signals are converted by the DSL phantom mode signal combination device into other DSL telecommunication signals that appear the terminals associated to the DSL transmission lines P1 and P2.

It is also to be noted that, the above description is valid for DownStream DS signals, flowing from the Central Office CO towards the Customer Premise Equipment CPE, as for UpStream US signals flowing in the other direction. The DSL phantom mode signal combination device operates in both signal directions.

If the phantom injection module PBox is located remotely from a Line Termination LT board of a telecommunication exchange, the DSL lines DM1 and DM2, as well as the third DSL line DM3 are connected to distinct ports of the Line Termination LT board. The DSL transmission lines P1 and P2 are then connected to distinct long distance telecommunication lines.

If the phantom injection module PBox is located remotely from a Main Distribution Frame MDF of a telecommunication exchange, the DSL lines DM1 and DM2, the third DSL line DM3, and the DSL transmission lines P1 and P2 are connected to terminals of the Main Distribution Frame MDF.

It is to be noted that the phantom injection module PBox may be designed for housing several DSL phantom mode signal combination devices. The phantom injection module PBox is then provided with several groups of terminals.

If the phantom injection module PBox is located close to a Customer Premise Equipment CPE, the DSL transmission lines P1 and P2 are connected to the other end of the long distance telecommunication lines, and the DSL lines DM1 and DM2, as well as the third DSL line DM3 are all three connected to the Customer Premise Equipment CPE.

The DSL phantom mode signal combination device comprises a first pair of series magnetically coupled coils LL11 and LL12, across which the two wires of the DSL transmission line P1 are connected. An up-terminal TL11 of the first coil LL11 is connected to a first wire of the DSL transmission line P1, whilst a down-terminal TL12 of the second coil LL12 is connected to the second wire of the DSL transmission line P1. The down-terminal of the first coil LL11 is coupled to the up-terminal of the second coil LL12 through a coupling device CP31.

The DSL phantom mode signal combination device further comprises a second pair of series magnetically coupled coils LL21 and LL22, across which the two wires of the DSL transmission line P2 are connected. An up-terminal TL21 of the first coil LL21 of this second pair is connected to a first wire of the DSL transmission line P2, whilst a down-terminal TL22 of the second coil LL22 of this second pair is connected to the second wire of the DSL transmission line P2. The down-terminal of the first coil LL21 is coupled to the up-terminal of the second coil LL22 through a second coupling device CP32.

The two-wire third DSL line DM3 has a first wire coupled to the first mentioned coupling device CP31, and has a second wire coupled to the second coupling device CP32.

In the parallel phantom injection of FIG. 1, the two wires of the DSL line DM1 are then connected across the serially and magnetically coupled coils LL11 and LL12 of the first pair, whilst the two wires of the DSL line DM2 are connected across the serially and magnetically coupled coils LL21 and LL22 of the second pair.

The up-terminal TL11 of the first coil LL11 is connected to the first wire of the DSL transmission line P1 and to the first wire of the DSL line DM1, whilst the down-terminal TL12 of the second coil LL12 is connected to the second wire of the DSL transmission line P1 and to the second wire of the DSL line DM1. Similarly, the up-terminal TL21 of the first coil LL21 is connected to the first wire of the DSL transmission line P2 and to the first wire of the DSL line DM2, whilst the down-terminal TL22 of the second coil LL22 is connected to the second wire of the DSL transmission line P2 and to the second wire of the DSL line DM2.

Figure 2:
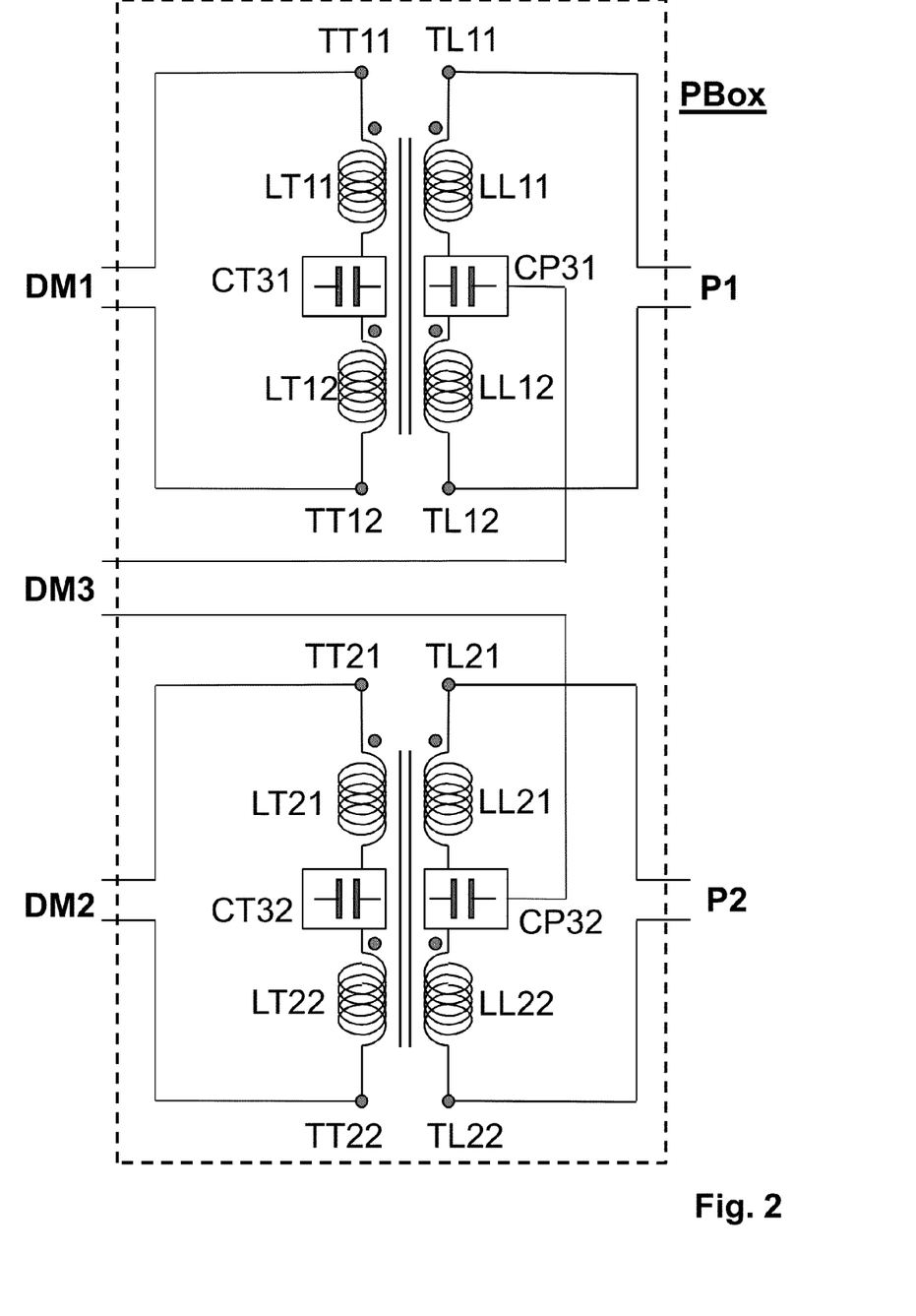
FIG. 2 represents a serial embodiment of the DSL phantom mode signal combination device according to the invention.

A second implementation of the DSL phantom mode signal combination device, called "serial phantom injection", is shown at FIG. 2. Therein, a series interruption occurs in each pair for the differential mode of operation and DSL phantom signal is injected simultaneously at the subscriber side.

In the serial phantom injection, the wires of the DSL lines DM1 and DM2 are no longer directly connected across the coils LL11, LL12 and LL21, LL22, respectively, but are magnetically coupled to these coils as will be explained below.

To this end, the serial DSL phantom mode signal combination device further comprises a third pair of series magnetically coupled coils LT11 and LT12, across which the two wires of the DSL line DM1 are connected. An up-terminal TT11 of the first coil LT11 of this third pair is connected to a first wire of the DSL line DM1, whilst a down-terminal TT12 of the second coil LT12 of this third pair is connected to the second wire of the DSL line DM1. The down-terminal of the first coil LT11 is coupled to the up-terminal of the second coil LT12 through a coupling device CT31.

The serial phantom injection device further comprises a fourth pair of series magnetically coupled coils LT21 and LT22, across which the two wires of the DSL line DM2 are connected. An up-terminal TT21 of the first coil LT21 of this fourth pair is connected to a first wire of the DSL line DM2, whilst a down-terminal TT22 of the second coil LT22 of this fourth pair is connected to the second wire of the DSL line DM2. The down-terminal of the first coil LT21 is coupled to the up-terminal of the second coil LT22 through a coupling device CT32.

The coupling devices, indicated in the Figs. with a capacitor, allow an AC coupling or high pass filtering. Either they can be present or omitted, and they can be realized in a symmetric or in an asymmetric way. This AC coupling can of course also be done, not at the center taps of the related transformer formed by the coils connected to the coupling device, but at its outer terminals, e.g. TL11 and TL12, of these coils.

In an embodiment of the DSL phantom mode signal combination device, the coupling devices CP31, CP32, CT31 and CT32 can all merely be a connection point between the down-terminal of the first coil LL11, LL21, LT11 and LT21 and the up-terminal of the second coil LL12, LL22, LT12 and LT22, respectively. The first wire of the third DSL line DM3 is then connected to the connection point CP31, whilst the second wire of the third DSL line DM3 is connected to the connection point CP32.

In a preferred embodiment, any of the coupling devices CP31, CP32, CT31 and CT32 can be a high frequency HF filter coupling between the down-terminal of the first coil LL11, LL21, LT11 and LT21 and the up-terminal of the second coil LL12, LL22, LT12 and LT22, respectively.

The first wire of the third DSL line DM3 is then connected to the high frequency HF filter coupling CP31, whilst the second wire of the third DSL line DM3 is connected to the high frequency HF filter coupling CP32.

A disadvantage for the serial phantom injection is that POTS signals can only be added at the subscriber side, i.e. on the DSL transmission lines P1 and P2, of the phantom injection module PBox. So, a rewiring is required if POTS is not available at the PBox location. With the parallel phantom injection, POTS signals can be added before or after, i.e. either on the DSL lines DM1 and DM2 or on the DSL transmission lines P1 and P2, of the phantom injection module PBox.

A drawback of the parallel phantom injection can be the distance between the phantom injection module PBox and the Line Termination LT boards. A long distance may create a STUB or Bridged Tap for the parallel phantom injection which influences the performance of the DSL phantom mode signal combination device in UpStream US and in DownStream DS.

Adding a common mode coil or common mode low pass filter in the parallel phantom injection solves this possible problem.

For the serial phantom injection, no STUB or Bridged Tap is created.

Another possible drawback of the parallel and of the serial phantom injection is the requirement to have a high common mode impedance path for the differential pairs towards the POTS board at the Central Office CO, especially for the DSL frequency bands.

Not all splitters are compliant to this requirement but this possible problem can be solved in the splitter at the Central Office CO by adding a low pass common mode filter (e.g. common mode coil).

However a better solution is to add a common mode filter coil in the phantom injection module PBox, together with the phantom injection circuitry of the DSL phantom mode signal combination device. In this way also the splitters and voice-cards of the Central Office CO can remain intact and do not require a replacement. On the other hand, the performance of the DSL phantom mode signal combination device is drastically improved.

Figure 3:
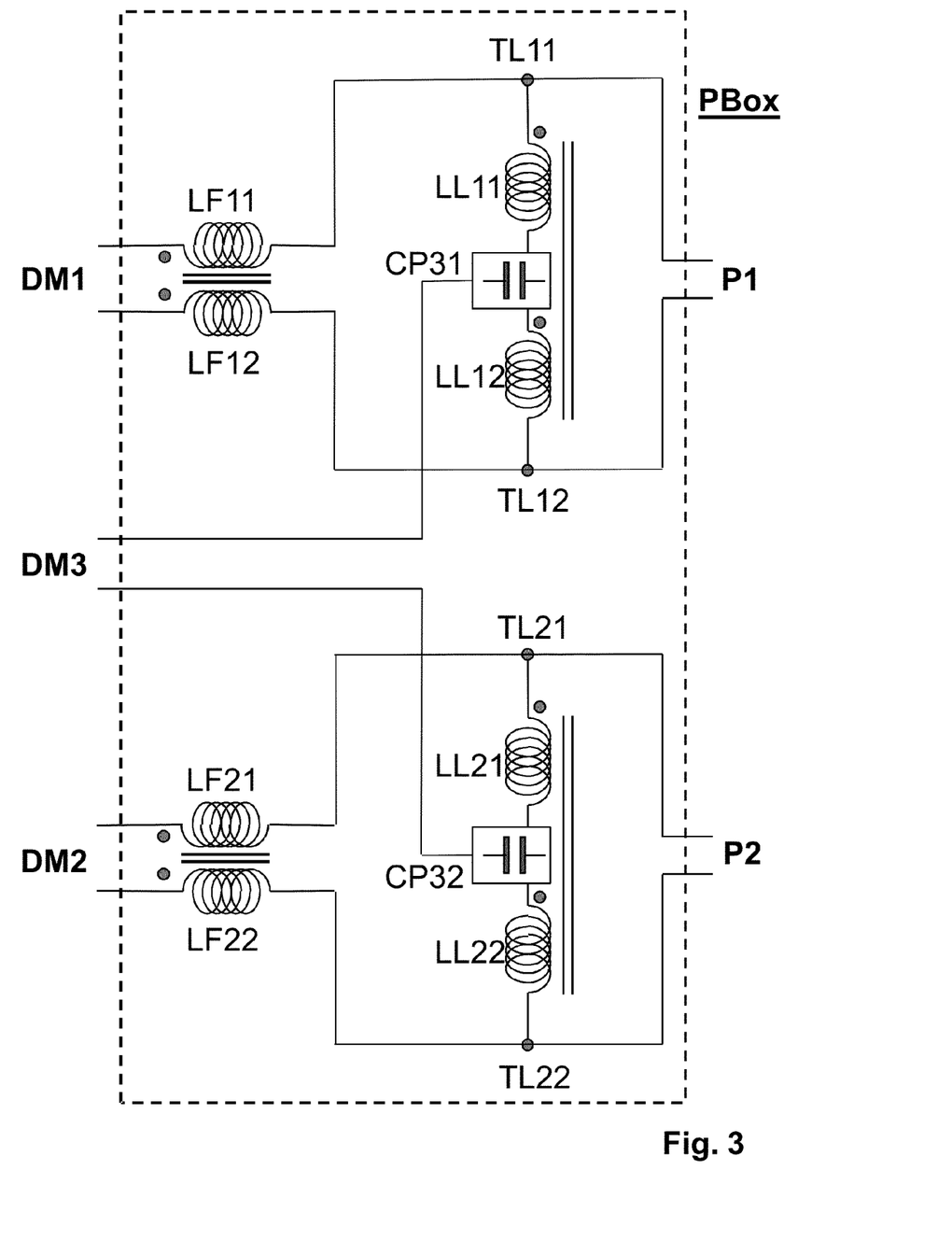
FIG. 3 represents a first improved version of the DSL phantom mode signal combination device of FIG. 1.

An embodiment of this improvement is shown at FIG. 3, with respect to the parallel phantom injection shown at FIG. 1. The up-terminal TL11 of the first coil LL11 of the first pair is electrically coupled to the first wire of the DSL line DM1 via a first filter coil LF11, and the down-terminal TL12 of the second coil LL12 of the first pair is electrically coupled to the second wire of this DSL line DM1 via a second filter coil LF12. The first filter coil LF11 and the second filter coil LF12 are magnetically coupled and both have their up-terminals connected to the DSL line DM1. Similarly, the up-terminal TL21 of the first coil LL21 of the second pair is electrically coupled to the first wire of the DSL line DM2 via a third filter coil LF21, and the down-terminal TL22 of the second coil LL22 of the second pair is electrically coupled to the second wire of this DSL line DM2 via a fourth filter coil LF22. The third filter coil LF21 and the fourth filter coil LF22 are magnetically coupled and both have their up-terminals connected to the DSL line DM2.

In order to resolve possible differences with the impedance of the phantom line DM3 with respect to the other DSL lines DM1 and DM2, the following improvement may be applied to the parallel phantom injection of FIG. 1 or FIG. 3.

Figure 4:
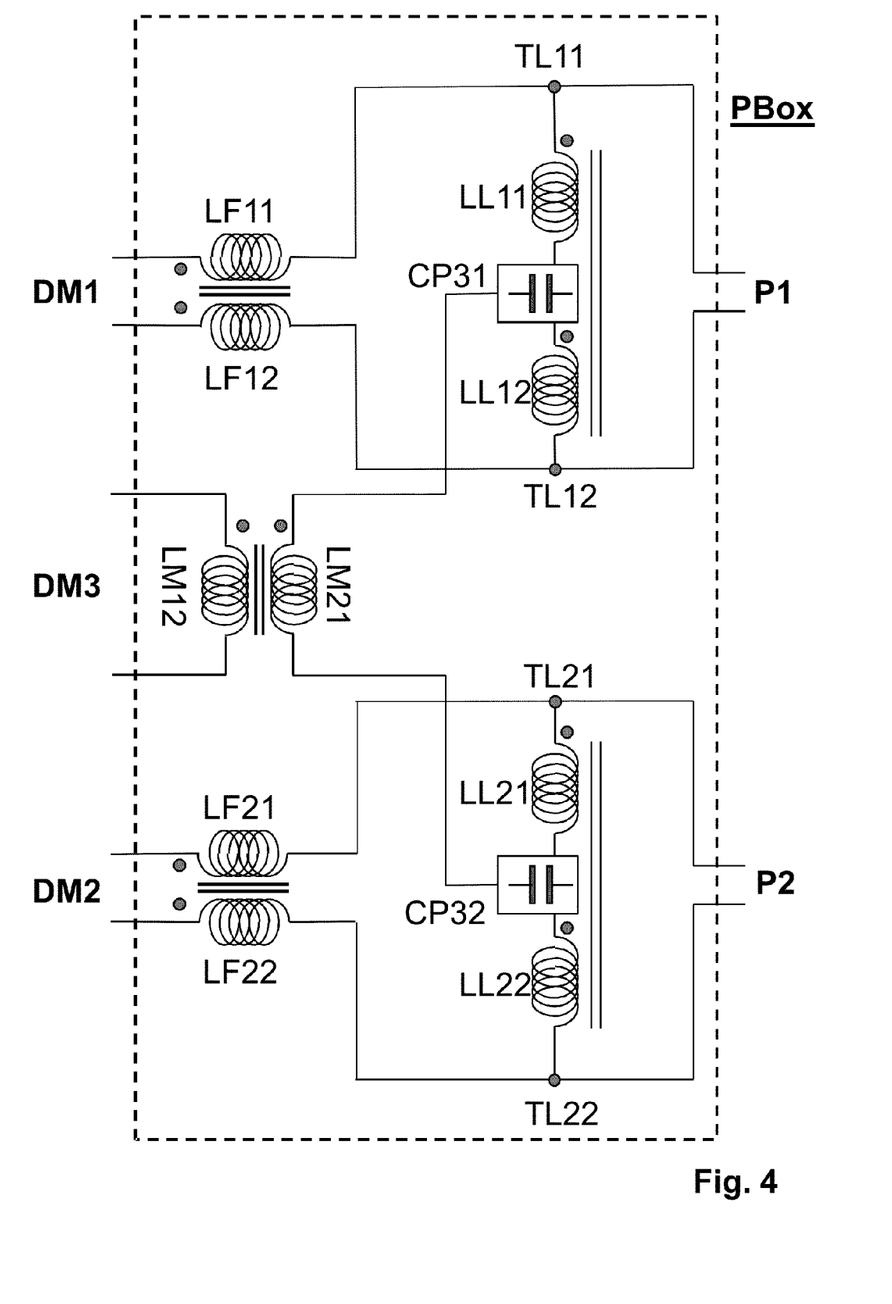
FIG. 4 represents a second improved version of the DSL phantom mode signal combination device of FIG. 1.

As shown at FIG. 4, two magnetically coupled coils LM12 and LM21 are added at the DSL line DM3. In more detail, a coil LM12 is coupled between the first wire and the second wire of the DSL line DM3, whilst a second coil LM21, magnetically coupled to the coil LM12, is coupled between the coupling device CP31 and the coupling device CP32.

Owing to this magnetically coupling through the coils LM12 and LM21, the DSL line DM3 may show a different impedance as the DSL lines DM1 and DM2 without disturbing the transmission of the DSL signals on these lines.

Best transmission performance is achieved when, the analogue front end of the DSL signals have an impedance close to the characteristic impedance of the connected transmission line. Since the present invention make use of the existing transmission equipment, this is only accomplished for the DSL line DM1 and the DSL line DM2, connected to the first and second transmission lines P1 and P2 respectively. Signals of the third DSL line DM3 are transferred to the phantom pair, formed by the first and second transmission lines P1 and P2 together and will in this case see a different characteristic impedance related to the used cable.

To improve the performance of the phantom pair an impedance transformation is necessary. To this end, an extra transformer will convert the existing analogue front end impedance into the correct phantom mode impedance. The coupling to this transformer can either be in a DC or AC manner, so including a high pass filter or not.

The above low pass filter LF11/LF12, LF21/LF22 applied in the parallel phantom injection even solves both the problems of the STUB and the common mode impedance towards the voice card.

Figure 5:
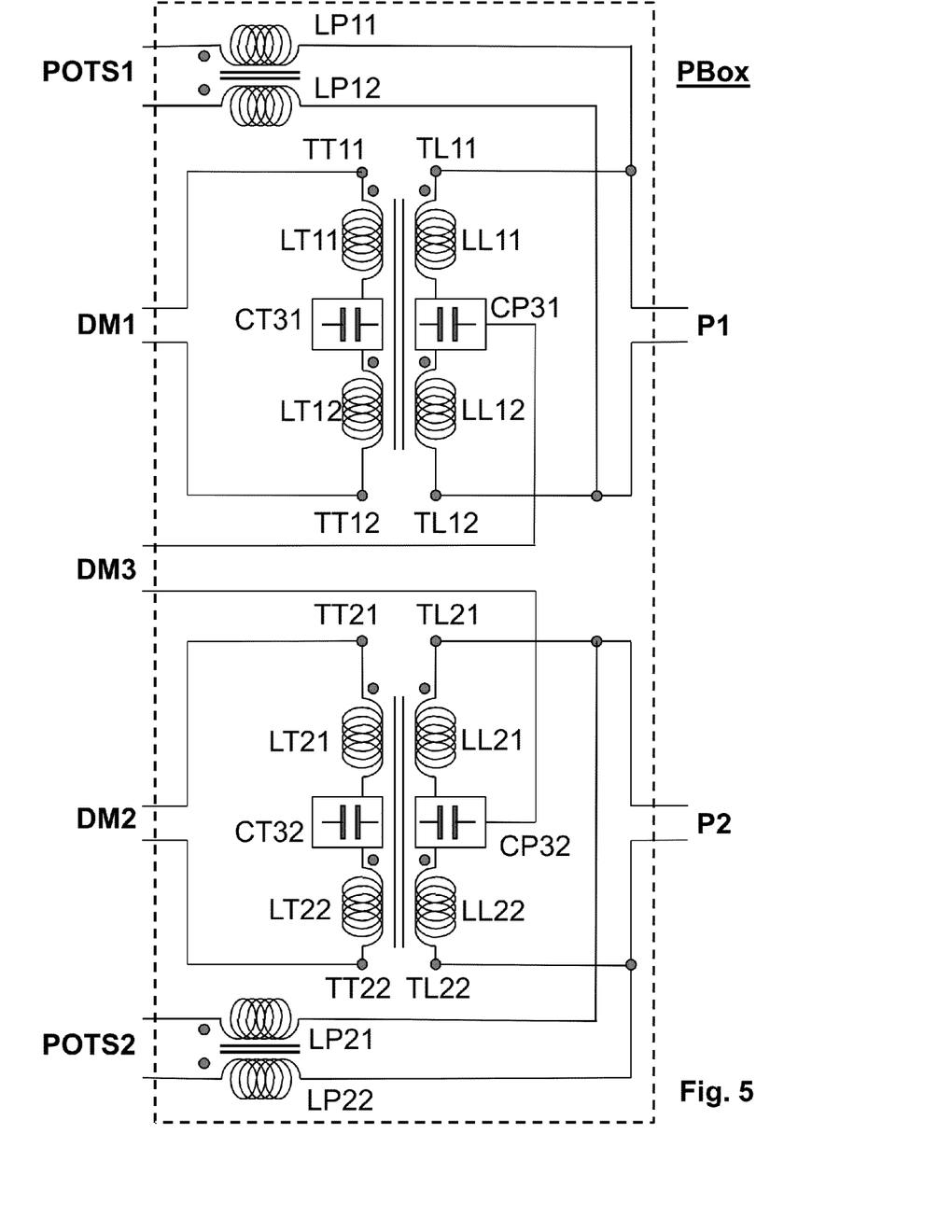
FIG. 5 represents an improved version of the DSL phantom mode signal combination device of FIG. 2.

For the serial phantom injection, Plain Old Telephone POTS signals can be injected in the DSL transmission lines P1 and P2 through pairs of coils LP11, LP12 and LP21, LP22 connected to POTS terminals coupling POTS lines POTS1 and POTS2 to the DSL transmission lines P1 and P2 respectively, as shown at FIG. 5 which represent an improvement of FIG. 2.

In more detail, a coil LP11 has a first terminal connected to a first wire of a first POTS line POTS1 and a second terminal connected to the first terminal TL11 of the coil LL11, and another coil LP12, magnetically coupled to the coil LP11, has a first terminal connected to a second wire of the first POTS line POTS1 and a second terminal connected to the first terminal TL12 of the coil LL12. Similarly, a coil LP21 has a first terminal connected to a first wire of a second POTS line POTS2 and a second terminal connected to the first terminal TL21 of the coil LL21, and another coil LP22, magnetically coupled to the coil LP21, has a first terminal connected to a second wire of the second POTS line POTS2 and a second terminal connected to the first terminal TL22 of the coil LL22.

Owing to these pairs of coils LP11, LP12 and LP21, LP22, the POTS lines POTS1 and POTS can be coupled to the DSL transmission lines P1 and P2 respectively without disturbing the DSL signals transmitted on these lines.

With this low pass common mode filter the POTS signals can be coupled to the transmission lines P1 and P2 in a high impedance condition, at least within the DSL bands, and so not disturbing the DSL signals.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is merely made by way of example and not as a limitation on the scope of the invention, as defined in the appended claims.

The invention claimed is:

1. A DSL phantom mode signal combination device adapted to convert first DSL telecommunication signals on a first DSL line, a second DSL line and a third DSL line to second DSL telecommunication signals on a first DSL transmission line and a second DSL transmission line,
   wherein said DSL phantom mode signal combination device comprises:
      a first pair of series coupled first and second passive components to which said first DSL line and said first DSL transmission line are electrically coupled, and
      a second pair of series coupled first and second passive components to which said second DSL line and said second DSL transmission line are electrically coupled,
   wherein said third DSL line is coupled to a first coupling means between the first and the second passive component of said first pair, and to a second coupling means between the first and the second passive component of said second pair,
   and wherein said DSL phantom mode signal combination device is built in a phantom injection module provided with at least five terminals respectively associated to said first DSL line, said second DSL line, said third DSL line, said first DSL transmission line and said second DSL transmission line.

2. The DSL phantom mode signal combination device according to claim 1,
   wherein said phantom injection module is remotely located from a Line Termination LT board of a telecommunication exchange,
   and wherein said first DSL line, said second DSL line and said third DSL line are connected to distinct ports of said Line Termination LT board.

3. The DSL phantom mode signal combination device according to claim 1,
wherein said phantom injection module is associated to a Main Distribution Frame MDF of a telecommunication exchange,
and wherein said first DSL line, said second DSL line, said third DSL line, said first DSL transmission line and said second DSL transmission line are connected to terminals of said Main Distribution Frame MDF.

4. The DSL phantom mode signal combination device according to claim 1,
wherein the first and second series coupled passive components of said first pair are coils which are magnetically coupled,
a first terminal of the first coil of said first pair being connected to a first wire of said first DSL transmission line,
a first terminal of the second coil of said first pair being connected to a second wire of said first DSL transmission line,
and said first coupling means being connected to a first wire of said third DSL line, to the second terminal of the first coil of said first pair, and to the second terminal of the second coil of said first pair,
and wherein the first and second series coupled passive components of said second pair are coils which are magnetically coupled,
a first terminal of the first coil of said second pair being connected to a first wire of said second DSL transmission line,
a first terminal of the second coil of said second pair being connected to a second wire of said second DSL transmission line,
and said second coupling means being connected to a second wire of said third DSL line, to the second terminal of the first coil of said second pair, and to the second terminal of the second coil of said second pair.

5. The DSL phantom mode signal combination device according to claim 4, wherein said DSL phantom mode signal combination device further comprises
a third pair of series coupled third and fourth coils which are magnetically coupled, a first terminal of the third coil of said third pair being connected to a first wire of said first DSL line, and the first terminal of the fourth coil of said third pair being connected to a second wire of said first DSL line, a second terminal of the third coil of said third pair being electrically coupled to a second terminal of the fourth coil of said third pair via a third coupling means, and
a fourth pair of series coupled third and fourth coils which are magnetically coupled, a first terminal of the third coil of said fourth pair being connected to a first wire of said second DSL line, and the first terminal of the fourth coil of said fourth pair being connected to a second wire of said second DSL line, a second terminal of the third coil of said fourth pair being electrically coupled to a second terminal of the fourth coil of said fourth pair via a fourth coupling means,
the third and fourth coils of said third pair being magnetically coupled to the first and second coils of said first pair, and the third and fourth coils of said fourth pair being magnetically coupled to the first and second coils of said second pair.

6. The DSL phantom mode signal combination device according to claim 4,
wherein the first terminal of the first coil of said first pair is electrically coupled to a first wire of said first DSL line, and the first terminal of the second coil of said first pair is electrically coupled to a second wire of said first DSL line,
and wherein the first terminal of the first coil of said second pair is electrically coupled to a first wire of said second DSL line, and the first terminal of the second coil of said second pair is electrically coupled to a second wire of said second DSL line.

7. The DSL phantom mode signal combination device according to claim 6,
wherein the first terminal of the first coil of said first pair is electrically coupled to the first wire of said first DSL line via a first filter coil, and the first terminal of the second coil of said first pair is electrically coupled to the second wire of said first DSL line via a second filter coil, said first filter coil and said second filter coil being magnetically coupled,
and wherein the first terminal of the first coil of said second pair is electrically coupled to the first wire of said second DSL line via a third filter coil, and the first terminal of the second coil of said second pair is electrically coupled to the second wire of said second DSL line via a fourth filter coil, said third filter coil and said fourth filter coil being magnetically coupled.

8. The DSL phantom mode signal combination device according to claim 5, wherein said DSL phantom mode signal combination device further comprises
a fifth pair of magnetically coupled fifth and sixth coils, said fifth coil of said fifth pair having a first terminal connected to a first wire of a first POTS line and a second terminal connected to said first terminal of the first coil of said first pair, and said sixth coil of said fifth pair having a first terminal connected to a second wire of said first POTS line and a second terminal connected to said first terminal of the second coil of said first pair,
and a sixth pair of magnetically coupled fifth and sixth coils, said fifth coil of said sixth pair having a first terminal connected to a first wire of a second POTS line and a second terminal connected to said first terminal of the first coil of said second pair, and said sixth coil of said sixth pair having a first terminal connected to a second wire of said second POTS line and a second terminal connected to said first terminal of the second coil of said second pair.

9. The DSL phantom mode signal combination device according to claim 6,
wherein a first wire of said third DSL line is coupled to a second wire of said third DSL line via a fifth coil,
wherein said first coupling means is coupled to said second coupling means via a sixth coil,
and wherein said fifth coil and said sixth coil are magnetically coupled.

10. The DSL phantom mode signal combination device according to claim 4,
wherein said first coupling means is a connection point between the first wire of said third DSL line, the second terminal of the first coil of said first pair, and the second terminal of the second coil of said first pair,
and wherein said second coupling means is a connection point between the second wire of said third DSL line, the second terminal of the first coil of said second pair, and the second terminal of the second coil of said second pair.

11. The DSL phantom mode signal combination device according to claim 4,
wherein said first coupling means is a high-pass frequency coupling between the first wire of said third DSL line, the second terminal of the first coil of said first pair, and the second terminal of the second coil of said first pair, and wherein said second coupling means is a high-pass frequency coupling between the second wire of said third DSL line, the second terminal of the first coil of said second pair, and the second terminal of the second coil of said second pair.

12. The DSL phantom mode signal combination device according to claim 1,
   wherein said phantom injection module is located close to a Customer Premise Equipment CPE,
   and wherein said first DSL line, said second DSL line and said third DSL line are connected to said Customer Premise Equipment CPE.

13. The DSL phantom mode signal combination device according to claim 1, wherein said device is located in a phantom injection module adapted to house a plurality of DSL phantom mode signal combination devices.

14. The DSL phantom mode signal combination device according to claim 1, wherein said first DSL transmission line and said second DSL transmission line are connected to distinct long distance telecommunication lines.

15. The DSL phantom mode signal combination device according to claim 1,
   wherein the DSL telecommunication signals on said first DSL transmission line and on said second DSL transmission line are signals comprising Digital Subscriber Line DSL information and Plain Old Telephone System POTS information,
   wherein the DSL telecommunication signals on said first DSL line and said second DSL line are signals comprising Digital Subscriber Line DSL information and Plain Old Telephone System POTS information,
   and wherein the DSL telecommunication signals on said third DSL line are signals comprising Digital Subscriber Line DSL information.

* * * * *